United States Patent
Ou et al.

(10) Patent No.: US 12,314,514 B2
(45) Date of Patent: May 27, 2025

(54) TOUCH SENSING APPARATUS, ELECTRONIC DEVICE AND TOUCH OPERATION RECORDING METHOD THEREOF

(71) Applicant: HIMAX TECHNOLOGIES LIMITED, Tainan (TW)

(72) Inventors: Yu Nian Ou, Tainan (TW); Chun Kai Chuang, Tainan (TW); Pei-Yuan Hung, Tainan (TW); Yung Hsiang Lin, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 18/050,477

(22) Filed: Oct. 28, 2022

(65) Prior Publication Data
US 2024/0143112 A1 May 2, 2024

(51) Int. Cl.
*G06F 3/041* (2006.01)
*G06F 11/00* (2006.01)

(52) U.S. Cl.
CPC ........ *G06F 3/04182* (2019.05); *G06F 3/0416* (2013.01); *G06F 11/00* (2013.01)

(58) Field of Classification Search
CPC ...... G06F 3/04182; G06F 11/00; G06F 11/07; G06F 11/0751
USPC ................................................. 345/173, 174
See application file for complete search history.

(56) References Cited

U.S. PATENT DOCUMENTS

| | | |
|---|---|---|
| 9,733,293 B1 | 8/2017 | Shen et al. |
| 2006/0224848 A1* | 10/2006 | Matulik ................. G06F 13/405 710/3 |
| 2011/0276313 A1* | 11/2011 | Inaba .................... G07C 5/0858 702/187 |
| 2012/0293336 A1 | 11/2012 | Pereverzev et al. |
| 2013/0207932 A1 | 8/2013 | Lee et al. |
| 2014/0071092 A1* | 3/2014 | Shih ....................... G06F 3/0446 345/175 |
| 2015/0371063 A1* | 12/2015 | Van Antwerpen ....... G09C 1/00 713/190 |
| 2016/0378264 A1 | 12/2016 | Shih et al. |
| 2019/0155450 A1* | 5/2019 | Kim ........................ G01L 1/146 |
| 2019/0317630 A1* | 10/2019 | Shaw ................... G06F 3/04166 |
| 2021/0056333 A1* | 2/2021 | Cheng .................... G06F 3/0416 |
| 2022/0382406 A1 | 12/2022 | Chou et al. |

FOREIGN PATENT DOCUMENTS

| | | |
|---|---|---|
| CN | 106095161 A | 11/2016 |
| CN | 107391293 A | 11/2017 |
| CN | 108549587 A | 9/2018 |
| CN | 108769381 A | 11/2018 |
| CN | 113342150 A | 9/2021 |
| CN | 114995675 A | 9/2022 |
| JP | 2001-318906 A | 11/2001 |

(Continued)

Primary Examiner — Jimmy H Nguyen
(74) Attorney, Agent, or Firm — CKC & Partners Co., LLC (57) ABSTRACT

A touch sensing apparatus includes a panel with touch detection function and a touch detection circuitry. The touch detection circuitry is coupled to the panel, and is configured to detect a touch operation on the panel, record an error event of the touch sensing apparatus, and write the error event into an external storage medium via a data transmission interface thereof.

19 Claims, 6 Drawing Sheets

(56) References Cited

FOREIGN PATENT DOCUMENTS

| | | |
|---|---|---|
| JP | 2011-239143 A | 11/2011 |
| JP | 2018-005659 A | 1/2018 |
| JP | 2021-197070 A | 12/2021 |
| KR | 2007-0122227 A | 12/2007 |
| KR | 2021-0010724 A | 1/2021 |
| KR | 102213714 B1 | 2/2021 |
| TW | 1764734 B | 5/2022 |
| WO | 2017/158907 A1 | 9/2017 |

* cited by examiner

TOUCH SENSING APPARATUS, ELECTRONIC DEVICE AND TOUCH OPERATION RECORDING METHOD THEREOF

BACKGROUND

Field of the Invention

The invention relates to error event detection for touch operations, and more particularly to a touch sensing apparatus, an electronic device and a touch operation recording method thereof with an error event detection function for touch operations.

Description of Related Art

Displays with touch detection functions are widely used for in-vehicle applications, such as automotive information display, vehicle navigation, video display, traffic conditions notification and/or the like. For an electronic device with touch detection functions, touch detection failures would occur if there exists an event error. However, in some situations, the error event can not be accurately or similarly reproduced, resulting in difficulty to trace the root causes of touch detection failures.

SUMMARY

One aspect of the invention directs to a touch sensing apparatus which includes a panel with touch detection function and a touch detection circuitry. The touch detection circuitry coupled to the panel and configured to detect a touch operation on the panel, record an error event of the touch sensing apparatus, and write the error event into an external storage medium via a data transmission interface thereof.

In accordance with one or more embodiments of the invention, the error event detected by the touch detection circuitry includes an electrostatic discharge (ESD) event, a system refreshing event, noise interference, panel broken, touch sensor open, touch sensor shorted, temperature anomaly, or system power anomaly.

In accordance with one or more embodiments of the invention, the touch detection circuitry waits until the data transmission interface is idle for writing error event if the data transmission interface is busy.

In accordance with one or more embodiments of the invention, the touch detection circuitry includes an ESD detection circuit that is configured to detect an ESD event of the panel.

In accordance with one or more embodiments of the invention, the touch detection circuitry includes a temperature sensor that is configured to detect a temperature of the touch detection circuitry.

In accordance with one or more embodiments of the invention, the external storage medium is a flash memory.

In accordance with one or more embodiments of the invention, the data transmission interface is a serial peripheral interface (SPI).

In accordance with one or more embodiments of the invention, the touch detection circuitry is a touch and display driver integration (TDDI) circuit.

In accordance with one or more embodiments of the invention, the touch sensing apparatus further includes a printed circuit board (PCB) that couples the touch detection circuitry to the memory.

Another aspect of the invention directs to an electronic device which includes a panel with touch detection function, an application processor and a touch detection circuitry. The touch detection circuitry is coupled to the panel and is configured to detect a touch operation on the panel, record an error event of the electronic device, and transmit the error event to the application processor via a data transmission interface thereof. The application processor is configured to write the error event to an external storage medium in response to receiving the error event from the touch detection circuitry.

In accordance with one or more embodiments of the invention, the error event detected by the touch detection circuitry includes an ESD event, a system refreshing event, noise interference, panel broken, touch sensor open, touch sensor shorted, temperature anomaly, or system power anomaly.

In accordance with one or more embodiments of the invention, the touch detection circuitry waits until the data transmission interface is idle for writing error event if the data transmission interface is busy.

In accordance with one or more embodiments of the invention, the external storage medium is a secure digital (SD) memory card or a transflash (TF) memory card.

In accordance with one or more embodiments of the invention, the data transmission interface is an inter integrated circuit (I2C) interface.

In accordance with one or more embodiments of the invention, the touch detection circuitry is a TDDI circuit.

Yet another aspect of the invention directs to a touch operation recording method for touch sensing which includes: configuring a touch detection circuitry to detect a touch operation on a panel with touch detection function and record an error event of the touch detection circuitry or the panel; and writing the error event into an external storage medium via a data transmission interface.

In accordance with one or more embodiments of the invention, writing the error event includes: determining whether the data transmission interface is busy; and waiting until the data transmission interface is idle for writing the error event if the data transmission interface is determined busy.

In accordance with one or more embodiments of the invention, the error event is written into the external storage medium directly by the touch detection circuitry.

In accordance with one or more embodiments of the invention, writing the error event includes: transmitting the error event to an application processor via the data transmission interface; and writing the error event to the external storage medium by the application processor in response to receiving the error event from the touch detection circuitry.

In accordance with one or more embodiments of the invention, the error event detected by the touch detection circuitry includes an ESD event, a system refreshing event, noise interference, panel broken, touch sensor open, touch sensor shorted, temperature anomaly, or system power anomaly.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings.

DETAILED DESCRIPTION

The detailed explanation of the invention is described as following. The described preferred embodiments are presented for purposes of illustrations and description, and they are not intended to limit the scope of the invention.

Terms used herein are only used to describe the specific embodiments, which are not used to limit the claims appended herewith. Unless limited otherwise, the term "a," "an," "one" or "the" of the single form may also represent the plural form.

In the following description and claims, the term "couple" along with their derivatives, may be used. In particular embodiments, "couple" may be used to indicate that two or more elements are in direct physical or electrical contact with each other, or may also mean that two or more elements may not be in direct contact with each other. "Couple" may still be used to indicate that two or more elements cooperate or interact with each other.

In this disclosure, an external storage medium serves as an error event recorder for immediately storing error events of a panel with touch detection function (e.g., a touch panel or a touch display panel). In particular, in a case in which a touch detection circuitry for driving the panel is interfered by noise, the point reporting information of the panel in a few seconds may be stored in the external storage medium for recording a ghost touch event when noise protection function is activated; in a case in which an abnormal event (e.g., overtemperature of the touch detection function) occurs and/or a self-relief execution is required, the detected abnormal event, the firmware condition and/or the condition for trigger self-relief may be immediately stored in the external storage medium before system damage or self-relief is executed. The error event recording mechanism according to the embodiments of the disclosure is beneficial for engineers to analyze root causes of touch detection failures.

Figure 1:
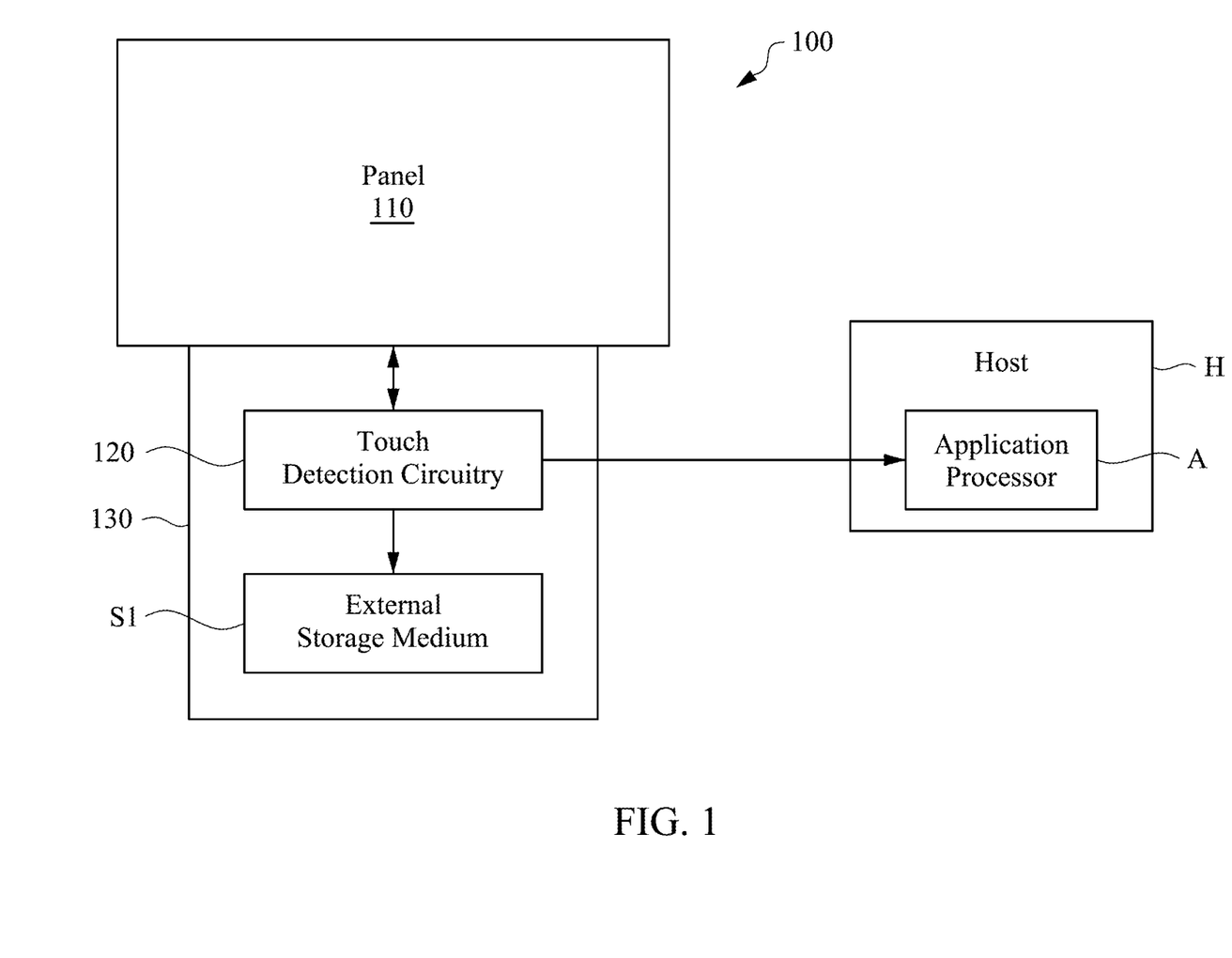
FIG. 1 is a schematic diagram of a touch sensing apparatus in accordance with some embodiments of the invention.

FIG. 1 is a schematic diagram of a touch sensing apparatus 100 in accordance with some embodiments of the invention. The touch sensing apparatus 100 includes a panel 110 with touch detection function and a touch detection circuitry 120. The panel 110 with touch detection function may have touch sensors arranged in an array. The touch detection circuitry 120 is coupled to the panel 110 for driving the panel 110 to perform touch detection. The touch detection circuitry 120 may also be coupled to a host H which may be an electronic device, such as an automotive infotainment display, a vehicle navigation device, and/or another suitable electronic device with a display screen, and the panel 110 may adhere to the host H to form an electronic device with a touch display screen. In some alternative embodiments, the panel 110 with touch detection function may be integrated into a display panel of the host H to form a touch display panel. In certain embodiments, the touch detection circuitry 120 is a touch and display driver integration (TDDI) circuit for touch detection driving on the panel 110 as well as display driving on the host H. The touch detection circuitry 120 may transmit coordinate(s) corresponding to a touch operation on the panel 110 to an application processor A of the host H for further operations. The external storage medium S1 may be removably inserted into the touch sensing apparatus 100. The external storage medium S1 may be a flash memory or another similar storage medium supported by the touch sensing apparatus 100 and suitable for the touch detection circuitry 120 to access (e.g., data writing).

In some embodiments, the touch sensing apparatus 100 further includes a printed circuit board (PCB) 130 that couples the touch detection circuitry 120 to the external storage medium S1 when the external storage medium S1 is inserted. The PCB 130 may be a rigid circuit board, a flexible printed circuit (FPC) board, or the like. In addition, the touch detection circuitry 120 may be bonded to the PCB 130 to form a chip-on-film (COF) package.

Figure 2:
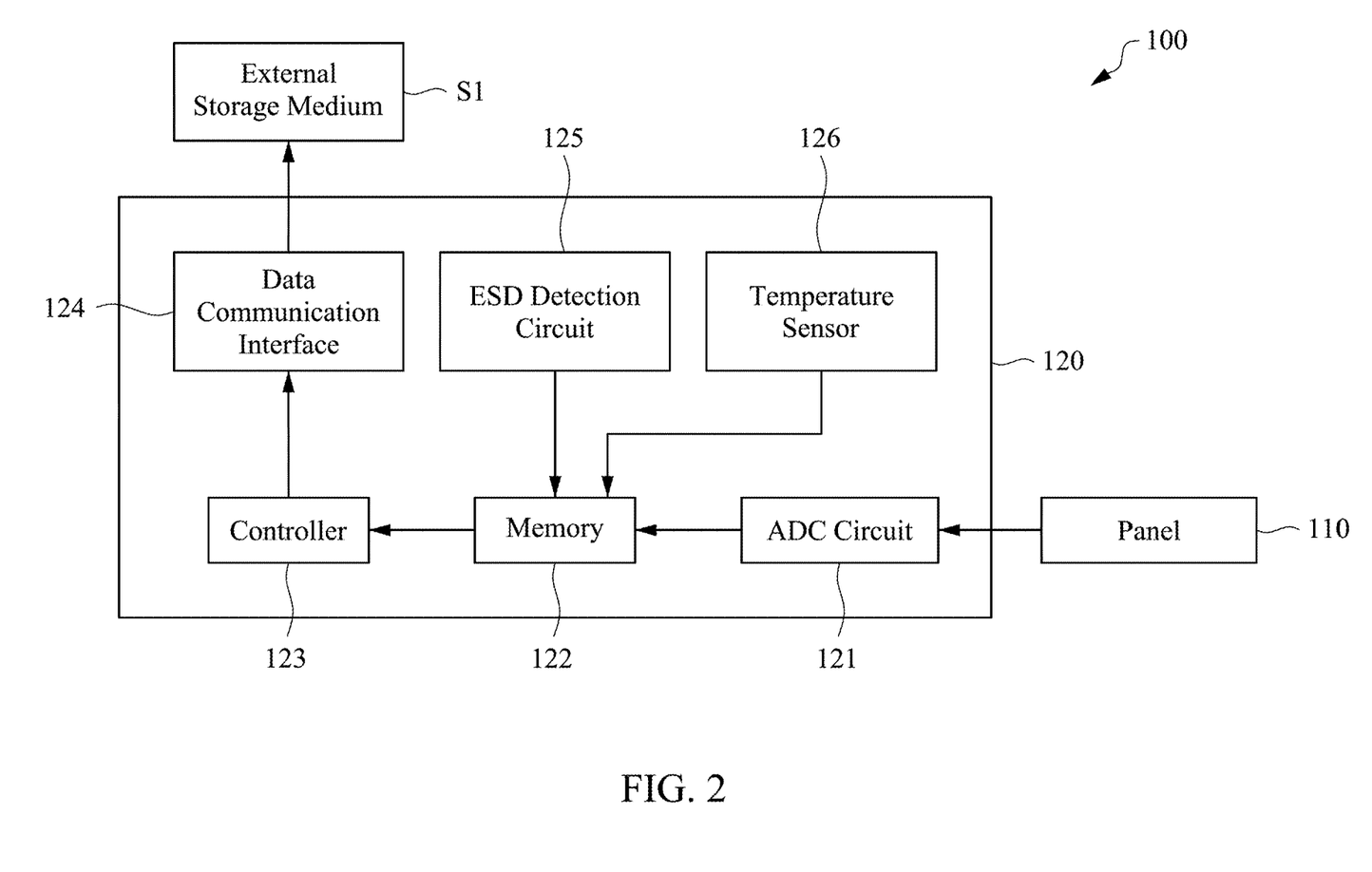
FIG. 2 exemplarily illustrates a functional block diagram of the touch detection circuitry in FIG. 1.

FIG. 2 exemplarily illustrates a functional block diagram of the touch detection circuitry 120 in FIG. 1. As shown in FIG. 2, the touch detection circuitry 120 includes an analog-to-digital converter (ADC) circuit 121, a memory 122, a controller 123 and a data communication interface 124. The ADC circuit 121 is configured to detect a touch operation on the panel 110 and convert a detected touch signal into touch data. The memory 122 is configured to store the touch data as well as any existing error event in the touch sensing apparatus 100. The error event in the touch sensing apparatus 100 may include, but is not limited to, an electrostatic discharge (ESD) event, a system refreshing event, noise interference, panel broken, touch sensor open, touch sensor shorted, temperature anomaly, or system power anomaly. The memory 122 may be a volatile memory, such as a static random access memory (SRAM), a dynamic random access memory (DRAM), and/or the like. The controller 123 is configured to calculate coordinate(s) of the panel 110 corresponding to a touch operation on the panel 110 from the touch data. The controller 123 may be, for example, a microcontroller unit (MCU), a microprocessor, an application-specific integrated circuit (ASIC), a programmable logic controller (PLC), or the like. The data communication interface 124 is configured to provide a communication path for the controller 123 to access the external storage medium S1. The data communication interface 124 may be, for example, a serial peripheral interface (SPI) or another suitable interface, depending on the type of the external storage medium S1. If there is any error event in the touch sensing apparatus 100, the controller 123 may obtain the error event from the memory 122 and then write the error event into the external storage medium S1 via the data communication interface 124. The error event written into the external storage medium S1 may include an error type code, an occurrence time and detailed information corresponding to the error type code. For example, if the error type code indicates noise interference, then the detailed information may include ghost touch coordinate(s). In some embodiments, the controller 123 may also write the calculated coordinate(s) into the external storage medium S1.

The touch detection circuitry 120 may further include an ESD detection circuit 125 and/or a temperature sensor 126 in certain embodiments. The ESD detection circuit 125 is configured to detect whether there is any ESD event, and may store a detected ESD event in the memory 122. The temperature sensor 126 is configured to detect a temperature of the touch detection circuitry 120, and may store temperature information in the memory 122.

Figure 3:
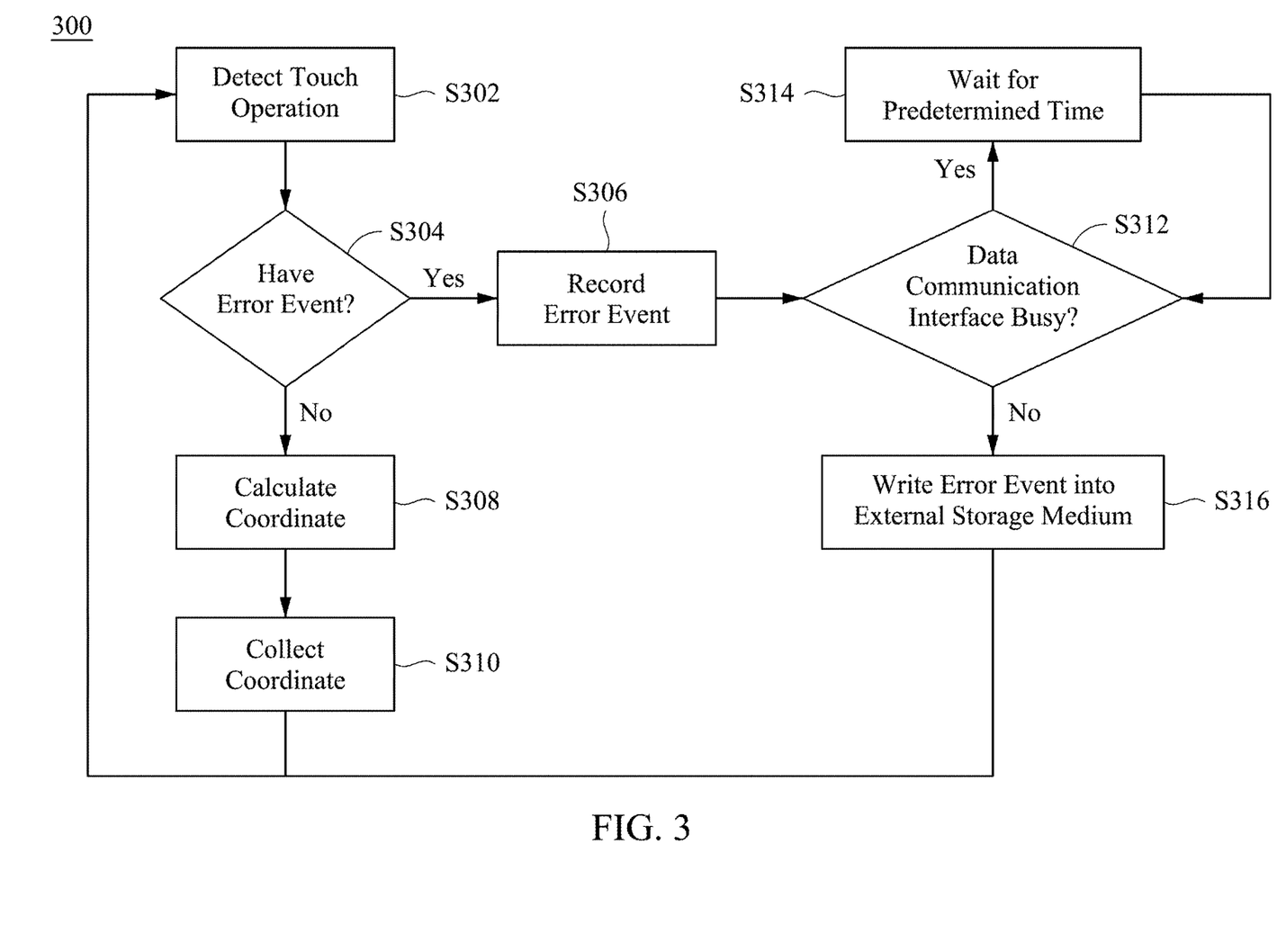
FIG. 3 is a flowchart of a touch operation recording method in accordance with some embodiments of the invention.

FIG. 3 is a flowchart of a touch operation recording method 300 in accordance with some embodiments of the invention. The touch operation recording method 300 may be applied to the configuration shown in FIG. 1 or another similar configuration. The following takes the configuration shown in FIG. 1 as an example for description. In Step S302, the touch detection circuitry 120 is configured to detect a touch operation on the panel 110, e.g., by a user's finger or a stylus. In Step S304, the touch detection circuitry 120 determines whether there is any error event in the touch sensing apparatus 100. If an error event exists in the touch sensing apparatus 100, then Step S306 is performed, in which the touch detection circuitry 120 records the error event. Otherwise, if there is no error event in the touch sensing apparatus 100, then Step S308 is performed, in which the touch detection circuitry 120 calculates coordinate(s) of the panel 110 corresponding to the touch operation, and subsequently the Step S310 is performed, in which the touch detection circuitry 120 transmits the coordinate(s) of the panel 110 to the host H, such that the host H collects the coordinate(s) for a further operation, such as initialing a call, opening an application, etc.

After the error event is recorded, Step S312 is then performed, in which the touch detection circuitry 120 determines whether the data communication interface 124 thereof is busy. If the data communication interface 124 is busy, then Step S314 is performed to wait for a predetermined time to repeat Step S312. Otherwise, if the data communication interface 124 is not busy (i.e., the data communication interface 124 is idle), then Step S316 is performed to write the error event into the external storage medium S1 via the data communication interface 124. Step S314 is repeatedly performed until the data communication interface 124 is idle.

The touch operation recording method 300 may be performed for every predetermined period (e.g., a frame period of the display screen of the host H). In addition, the touch detection circuitry 120 may be configured to activate and deactivate the touch operation recording method 300 depending on usage demands of the touch sensing apparatus 100.

Figure 4:
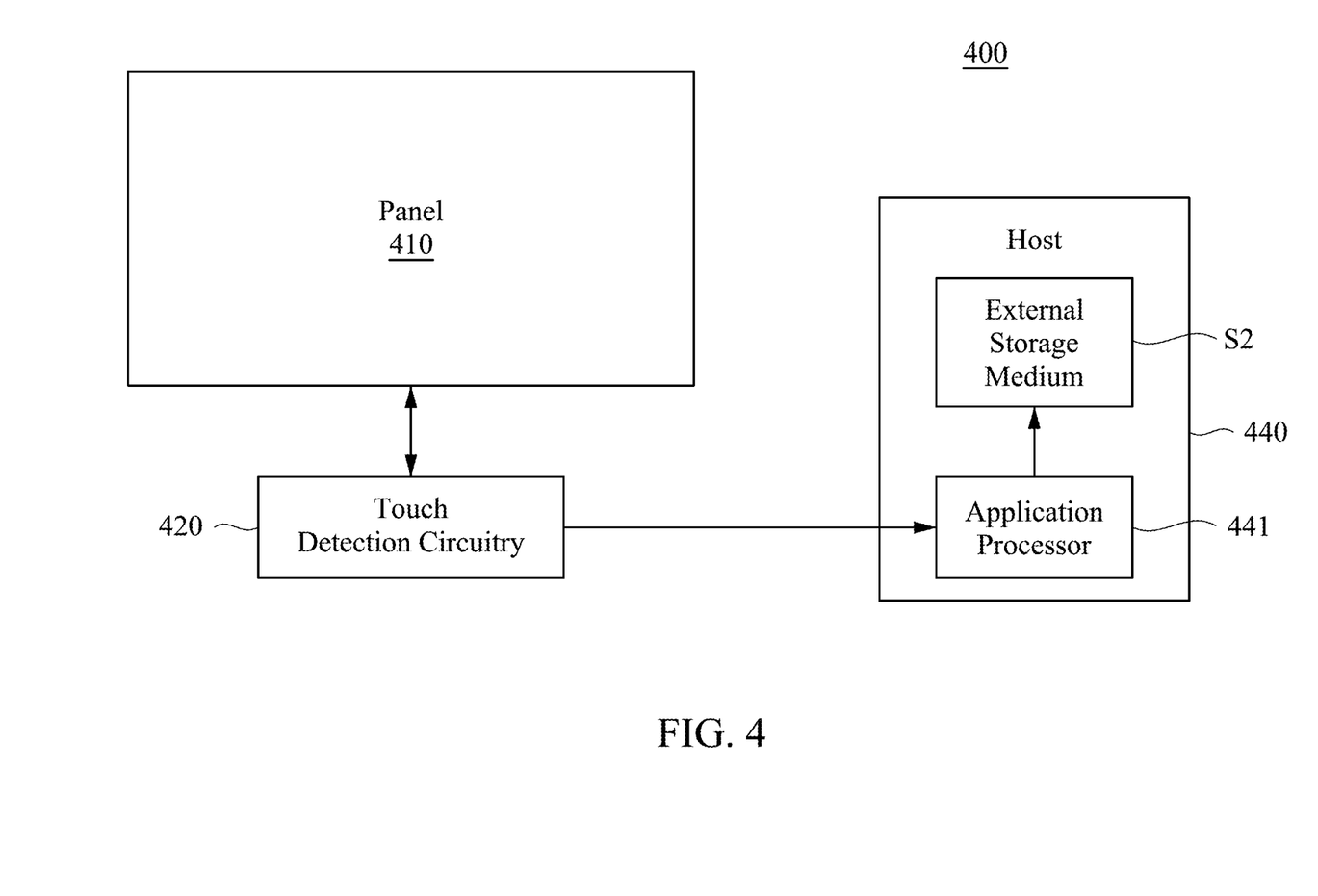
FIG. 4 is a schematic diagram of an electronic device in accordance with some embodiments of the invention.

FIG. 4 is a schematic diagram of an electronic device 400 in accordance with some embodiments of the invention. The electronic device 400 may be, for example, an automotive infotainment display, a vehicle navigation device, and/or another suitable electronic device with touch detection and display functions. The electronic device 400 includes a panel 410 with touch detection function and a touch detection circuitry 420 as well as a host 440. The panel 410 with touch detection function may have touch sensors arranged in an array. The touch detection circuitry 420 is coupled to the panel 410 for driving the panel 410 to perform touch detection. The host 440 includes an application processor 441 for handling user applications. The application processor 441 may be a system on chip (SoC), a MCU, a microprocessor, etc. In some alternative embodiments, the panel 410 with touch detection function may be integrated into a display panel of the host 440 to form a touch display panel. In certain embodiments, the touch detection circuitry 420 is a TDDI circuit for touch detection driving on the panel 410 as well as display driving on the host 440. The touch detection circuitry 420 may transmit coordinate(s) corresponding to a touch operation on the panel 410 to the application processor 441 for further operations, such as showing a current location in a map, playing a video, etc. The application processor 441 may also access an external storage medium S2 inserted in the host 440. The external storage medium S2 may be removably inserted into the electronic device 400. The external storage medium S2 may be a secure digital (SD) memory card, a transflash (TF) memory card or another similar storage medium supported by the host 440 and suitable for the application processor 441 to access (e.g., data writing).

Figure 5:
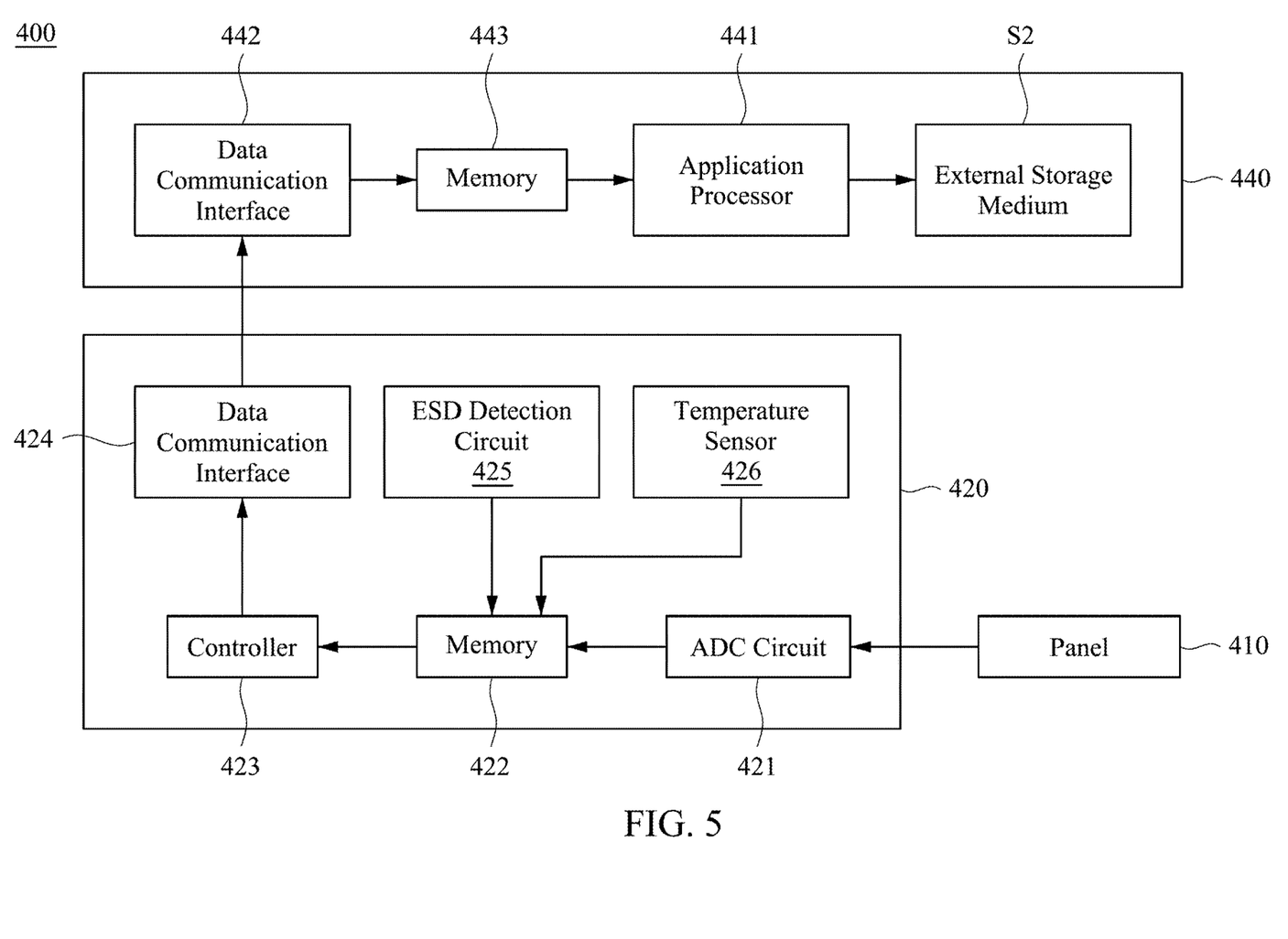
FIG. 5 exemplarily illustrates a functional block diagram of the touch detection circuitry and the host in FIG. 4.

FIG. 5 exemplarily illustrates a functional block diagram of the touch detection circuitry 420 and the host 440 in FIG. 4. As shown in FIG. 5, the touch detection circuitry 420 includes an ADC circuit 421, a memory 422, a controller 423 and a data communication interface 424, and the host 440 includes a data communication interface 442 and a memory 443 as well as the application processor 441.

The ADC circuit 421 is configured to detect a touch operation on the panel 410 and convert a detected touch signal into touch data. The memory 422 is configured to store the touch data as well as any existing error event in the electronic device 400. The error event in the electronic device 400 may include, but is not limited to, an ESD event, a system refreshing event, noise interference, panel broken, touch sensor open, touch sensor shorted, temperature anomaly, or system power anomaly. The memory 422 may be a volatile memory, such as a SRAM, a DRAM, and/or the like. The controller 423 is configured to calculate coordinate(s) of the panel 410 corresponding to a touch operation on the panel 410 from the touch data. The controller 423 may be, for example, a MCU, a microprocessor, an ASIC, a PLC, or the like. The data communication interface 424 is configured to provide a communication path for the controller 423 to communicate with the host 440. Similar to the touch detection circuitry 120 in FIG. 2, the touch detection circuitry 420 may further include an ESD detection circuit 425 and/or a temperature sensor 426 in certain embodiments.

In the host 440, the data communication interface 442 is configured to provide a communication path for the application processor 441 to communicate with the touch detection circuitry 420. Each of the data communication interfaces 424, 442 may be, for example, an inter integrated circuit (I2C) interface or another suitable interface. The memory 443 is configured to store the data transmitted from the touch detection circuitry 420, such as the touch data as well as any existing error event in the electronic device 400. Similarly, the memory 443 may be a volatile memory, such as a SRAM, a DRAM, and/or the like. The application processor 441 is configured to collect the stored data in the memory 443. If there is any error event in the electronic device 400, the application processor 441 may write the error event into the external storage medium S2. In some embodiments, the application processor 441 may also write the calculated coordinate(s) into the external storage medium S2.

Figure 6:
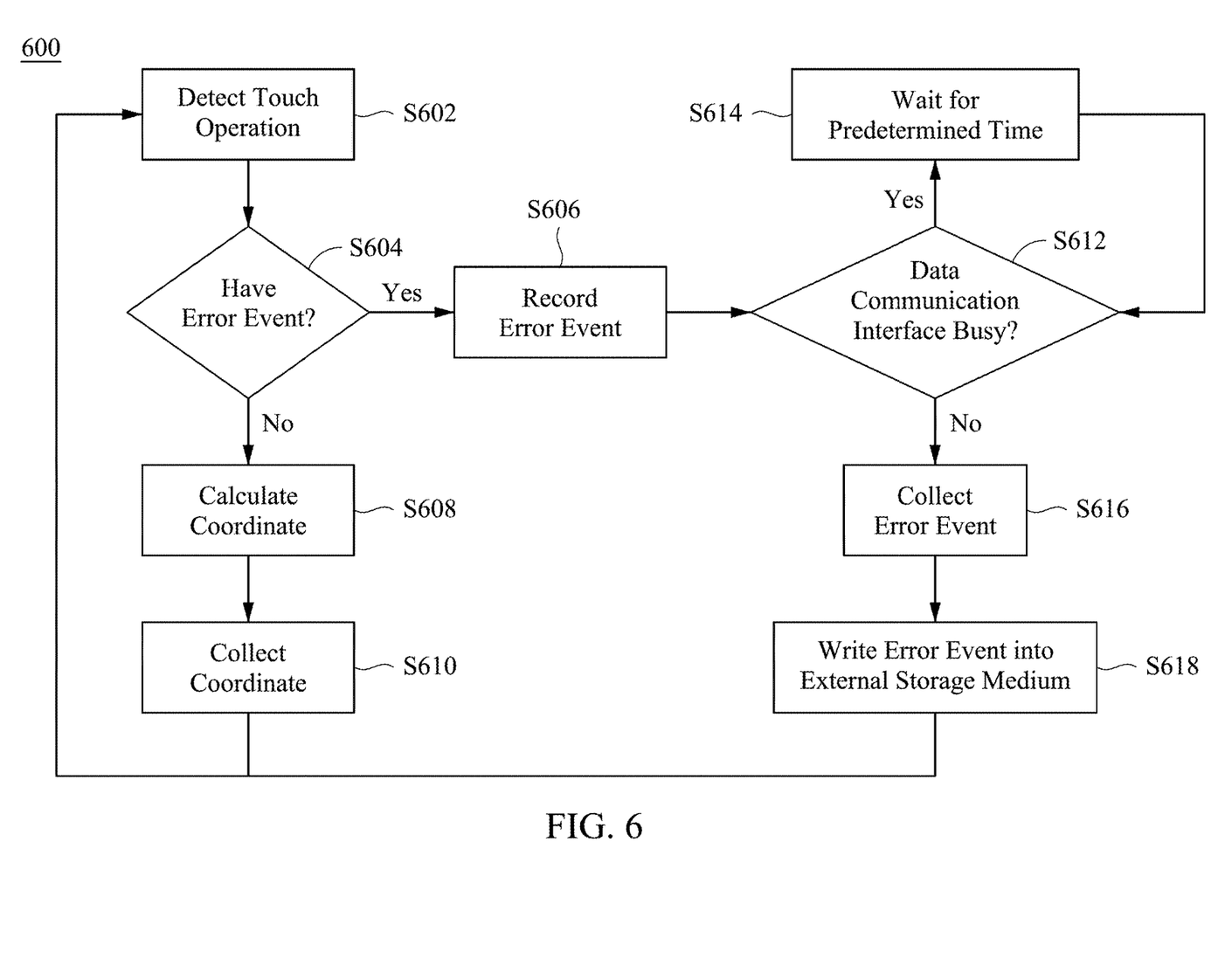
FIG. 6 is a flowchart of a touch operation recording method in accordance with some embodiments of the invention.

FIG. 6 is a flowchart of a touch operation recording method 600 in accordance with some embodiments of the invention. The touch operation recording method 600 may be applied to the configuration shown in FIG. 4 or another similar configuration. The following takes the configuration shown in FIG. 4 as an example for description. In Step S602, the touch detection circuitry 420 is configured to detect a touch operation on the panel 410, e.g., by a user's finger or a stylus. In Step S604, the touch detection circuitry 420 determines whether there is any error event in the electronic device 400. If an error event exists in the electronic device 400, then Step S606 is performed, in which the touch detection circuitry 420 records the error event. Otherwise, if there is no error event in the electronic device 400, then Step S608 is performed, in which the touch detection circuitry 420 calculates coordinate(s) of the panel 410 corresponding to the touch operation, and subsequently the Step S610 is performed, in which the touch detection circuitry 420 transmits the coordinate(s) of the panel 410 to the host 440, such that the host 440 collects the coordinate(s) for a further operation, e.g., showing a current location in a map, playing a video, etc.

After the error event is recorded, Step S612 is then performed, in which the touch detection circuitry 420 determines whether the data communication interface 424 thereof is busy. If the data communication interface 424 is busy, then Step S614 is performed to wait for a predetermined time to repeat Step S612. Otherwise, if the data communication interface 424 is not busy (i.e., the data communication interface 424 is idle), then Step S616 is performed, in which the host 440 collects the error event from the touch detection circuitry 420, and then Step S618 is performed, in which the host 440 writes the error event into the external storage medium S2. Step S614 is repeatedly performed until the data communication interface 424 is idle.

The touch operation recording method 600 may be performed for every predetermined period (e.g., a frame period of the display screen of the host 440). In addition, the touch detection circuitry 420 may be configured to activate and deactivate the touch operation recording method 600 depending on usage demands of the electronic device 400.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims.

What is claimed is:

1. A touch sensing apparatus, comprising:
    a panel with touch detection function; and
    a touch detection circuitry coupled to the panel and configured to detect a touch operation on the panel, determine whether the touch sensing apparatus has an error event for every predetermined period, and record the error event while determining that the touch sensing apparatus has the error event, and write the error event into an external storage medium via a data transmission interface of the touch detection circuitry in response to receiving the error event from the touch detection circuitry, wherein the external storage medium is removably connected to the touch sensing apparatus,
    wherein the error event is written into the external storage medium directly by the touch detection circuitry in response to receiving the error event from the touch detection circuitry.

2. The touch sensing apparatus of claim 1, wherein the error event detected by the touch detection circuitry comprises an electrostatic discharge (ESD) event, a system refreshing event, noise interference, panel broken, touch sensor open, touch sensor shorted, temperature anomaly, or system power anomaly.

3. The touch sensing apparatus of claim 1, wherein the touch detection circuitry waits until the data transmission interface is idle for writing error event if the data transmission interface is busy.

4. The touch sensing apparatus of claim 1, wherein the touch detection circuitry comprises:
    an electrostatic discharge (ESD) detection circuit configured to detect an ESD event of the panel.

5. The touch sensing apparatus of claim 1, wherein the touch detection circuitry comprises:
    a temperature sensor configured to detect a temperature of the touch detection circuitry.

6. The touch sensing apparatus of claim 1, wherein the external storage medium is a flash memory.

7. The touch sensing apparatus of claim 1, wherein the data transmission interface is a serial peripheral interface (SPI).

8. The touch sensing apparatus of claim 1, wherein the touch detection circuitry is a touch and display driver integration (TDDI) circuit.

9. The touch sensing apparatus of claim 1, further comprising:
    a printed circuit board (PCB) that couples the touch detection circuitry to the external storage medium.

10. An electronic device, comprising:
    a panel with touch detection function;
    an application processor; and
    a touch detection circuitry coupled to the panel and configured to detect a touch operation on the panel, determine whether the electronic device has an error event for every predetermined period, and record the error event while determining that the electronic device has the error event, and transmit the error event to the application processor via a data transmission interface thereof;
    wherein the application processor is configured to write the error event to an external storage medium in response to receiving the error event from the touch detection circuitry;
    wherein the external storage medium is removably connected to the electronic device,
    wherein the error event is written into the external storage medium directly by the application processor in response to receiving the error event from the touch detection circuitry.

11. The electronic device of claim 10, wherein the error event detected by the touch detection circuitry comprises an electrostatic discharge (ESD) event, a system refreshing event, noise interference, panel broken, touch sensor open, touch sensor shorted, temperature anomaly, or system power anomaly.

12. The electronic device of claim 10, wherein the touch detection circuitry waits until the data transmission interface is idle for writing error event if the data transmission interface is busy.

13. The electronic device of claim 10, wherein the external storage medium is a secure digital (SD) memory card or a transflash (TF) memory card.

14. The electronic device of claim 10, wherein the data transmission interface is an inter integrated circuit (I2C) interface.

15. The electronic device of claim 10, wherein the touch detection circuitry is a touch and display driver integration (TDDI) circuit.

16. A touch operation recording method for touch sensing, comprising:
    configuring a touch detection circuitry to detect a touch operation on a panel and determine whether the touch detection circuitry or the panel has an error event for every predetermined period, and record the error event while determining that the touch detection circuitry or the panel has the error event; and
    writing the error event into an external storage medium via a data transmission interface of the touch detection circuitry in response to receiving the error event from the touch detection circuitry or the panel, wherein the external storage medium is removably connected to a touch sensing apparatus comprising the touch detection circuitry and the panel, and, wherein the error event is written into the external storage medium directly by the touch detection circuitry in response to receiving the error event from the touch detection circuitry or the panel.

17. The touch operation recording method of claim 16, wherein writing the error event comprising:
   determining whether the data transmission interface is busy; and
   waiting until the data transmission interface is idle for writing the error event if the data transmission interface is determined busy.

18. The touch operation recording method of claim 16, wherein writing the error event comprising:
   transmitting the error event to an application processor via the data transmission interface; and
   writing the error event to the external storage medium by the application processor in response to receiving the error event from the touch detection circuitry.

19. The touch operation recording method of claim 16, wherein the error event detected by the touch detection circuitry comprises an electrostatic discharge (ESD) event, a system refreshing event, noise interference, panel broken, touch sensor open, touch sensor shorted, temperature anomaly, or system power anomaly.

* * * * *